United States Patent [19]

Pitzer

[11] 3,925,499

[45] Dec. 9, 1975

[54] OXIDATIVE DEHYDROGENATION USING GROUP IA OR IIA METAL/SN/P/O CATALYST

[75] Inventor: Emory W. Pitzer, Bartlesville, Okla.

[73] Assignee: Phillips Petroleum Company, Bartlesville, Okla.

[22] Filed: Apr. 1, 1974

[21] Appl. No.: 456,876

Related U.S. Application Data

[62] Division of Ser. No. 194,614, Nov. 1, 1971, Pat. No. 3,824,195.

[52] U.S. Cl...... 260/680 E; 260/290 V; 260/666 A; 260/669 R
[51] Int. Cl.$^2$.......................................... C07C 5/48
[58] Field of Search ........ 260/680 E, 290 V, 669 R, 260/666 A

[56] References Cited

UNITED STATES PATENTS

| | | | |
|---|---|---|---|
| 3,716,545 | 2/1973 | Ripley | 260/290 V |
| 3,732,327 | 5/1973 | Pitzer | 260/680 E |
| 3,789,078 | 1/1974 | Nolan et al. | 260/680 E |
| 3,824,195 | 7/1974 | Pitzer | 260/680 E |

Primary Examiner—Paul M. Coughlan, Jr.

[57] ABSTRACT

A process for the oxidative dehydrogenation of an organic feedstock utilizing a catalyst comprising a Group IA or Group IIA metal/tin/phosphorus/oxygen composition is disclosed. Also disclosed is a method of reactivating a composition of a similar nature. The improved catalyst and the reactivated catalyst, both, are formed by procedures involving phosphorus deposition. The preferred metal is lithium.

8 Claims, No Drawings

OXIDATIVE DEHYDROGENATION USING GROUP IA OR IIA METAL/SN/P/O CATALYST

This is a division of copending Ser. No. 194,614 filed Nov. 1, 1971, U.S. Pat. No. 3,824,195.

This invention relates to an improved oxidative dehydrogenation catalyst.

In one of its more specific aspects, this invention relates to an improved catalyst, the method of its preparation and to its employment in dehydrogenation of alkenes.

The present invention pertains to the preparation and use of a Group IA or IIA metal/Sn/PlO catalyst in which lithium is the preferred Group IA or Group IIA metal. In its basic embodiment, the catalyst is generally in the form of a shaped Li/Sn/P/O catalyst such as a tablet. In this form it is employed to dehydrogenate alkenes, cycloalkenes, alkylpyridines and alkylaromatics. The alkenes will have about 3 to about 10 carbon atoms per molecule; the cycloalkenes will have from about 4 to about 10 carbon atoms per molecule; the alkylpyridines and alkylaromatics will have from about 1 to 4 alkyl groups per molecule, the alkyl groups containing 1 to about 6 carbon atoms per group with at least 1 alkyl group containing at least 2 carbon atoms. Examples of suitable feedstocks include propylene, octenes, cyclohexene, 3-isopentylcyclopentene, propylbenzene, ethylpyridine, 2,3,4-trimethyl-5-ethylpyridine, and mixtures of the above.

In its basic embodiment, the feedstocks are oxidatively dehydrogenated at temperatures in the range of from about 700° to about 1300°F. at pressures from about 0.05 to about 250 psia. The conversion is conducted in the presence of a free oxygen-containing gas, such as air, at oxygen: gaseous organic feed volumetric ratios of from about 0.1 to 1 to about 3 to 1. Steam can be introduced to provide steam to organic feed volumetric ratios of from about 0.1 to 1 to about 50 to 1. The gaseous hourly space rate of the feedstock will be from about 50 to 5000 GHSV.

The process is carried out by forming a mixture comprising feed, steam and the free oxygen-containing gas, passing this mixture into contact with the catalyst under the prescribed conditions to produce a reaction product from which the desired product is separated by conventional methods.

The above process conditions also apply to the employment of the catalyst as produced by the present invention. According to this invention there is provided a method for preparing an improved dehydrogenation catalyst, a method reactivating a dehydrogenation catalyst, an improved dehydrogenation catalyst and a regenerated catalyst.

The improved catalyst of this invention will have improved selectivity to desired products and increased physical strength.

The catalyst of the present invention is prepared by forming a shaped Sn/P/O composition to produce a catalyst structure containing from about 0.1 to about 14 weight percent phosphorus. This structure is then impregnated with an additional amount of phosphorus, in an amount from about 1 to about 3.5 weight percent such that the total phosphorus content of the Sn/P/O composition does not exceed about 15 weight percent. This composition is dried and calcined and impregnated with lithium in an amount from about 0.1 to about 10 weight percent based on the Sn/P/O composition. The resulting composition is then dried and calcined.

In respect to the regenerated catalyst, a used catalyst, having an impaired catalytic activity, is impregnated with phosphorus and with lithium, consecutively, to restore its activity.

In preparing the improved catalyst, the shaped Sn/P/O composition can be prepared by any method which will produce a shaped mixture of tin oxide and tin phosphate containing from about 0.1 to about 14 weight percent phosphorus. Preferably, this composition will have a surface area of at least about one square meter per gram.

The tin content of the composition will depend upon the amount of phosphorus present but will generally be in the range of from about 15 to about 75 weight percent. The remainder of the composition will comprise oxygen in amounts sufficient to satisfy the valence requirements of the phosphorus and tin.

In a preferred method of preparation, the Sn/P/O composition is prepared by mixing a suitable phosphorus compound, for example, phosphoric acid and a suitable tin compound, for example, stannic chloride, followed by coprecipitation with ammonia, aging, washing, drying, shaping, and calcining. Whichever mode of preparation is employed, the composition at this stage will consist essentially of phosphorus, tin and combined oxygen.

This shaped and calcined composition is then impregnated with an additional 1–3.5 weight percent phosphorus. This impregnation can be carried out using any phosphorus-containing solution including those employed to form the coprecipitated Sn/P/O composition.

Following this phosphorus impregnation, the shaped catalyst is dried and calcined in air at about 1000° to about 1500°F. for from about 0.1 to about 24 hours.

The shaped composition, having phosphorus incorporated into it in two operations, is then impregnated with from about 0.1 to about 10 weight percent lithium based on the Sn/P/O composition. Lithium compounds convertible to the oxide on calcination are used, these including lithium nitrate, lithium acetate and the like.

If other Group IA or IIA metals are employed, suitable compounds including sodium carbonate, potassium nitrate, magnesium formate, calcium acetate, barium propionate and the like, can be used.

Following impregnation with the metal of Group IA or Group IIA, the composition is calcined in air at about 1000° to 1500°F. for from about 0.1 to about 24 hours, the resulting composition comprising the improved catalyst.

As mentioned, one embodiment of the present invention involves the rejuvenation of used Li/Sn/P/O catalyst to restore its selectivity or strength. Such catalysts are rejuvenated by subjecting them to consecutive impregnations with a phosphorus-containing compound and with a lithium-containing compound. These impregnations are carried out in a manner comparable to that described above for the preparation of fresh catalysts.

The following examples will serve to demonstrate the best mode for carrying out the method of this invention.

EXAMPLE I

Catalyst A was a commercial tin oxide-tin phosphate composition containing about 10 weight percent phosphorus in the form of ⅛ inch tablets. It had been prepared by the coprecipitation of tin chloride and phosphoric acid followed by washing, drying, pelletizing and calcining.

Catalyst B, a catalyst of the invention, was prepared by impregnating Catalyst A, first with phosphoric acid and then with lithium nitrate. A 25 ml quantity (about 32.5 g) of catalyst was immersed in a 35 ml aqueous solution containing 8.1 g of $H_3PO_4$ (85 percent) for 5 minutes. The pellets were then drained of excess liquid, dried and calcined by heating in air at about 1100°F.

These catalyst tablets were then immersed for five minutes in a 35 ml aqueous solution containing 19.8 g of $LiNO_3$. The tablets were drained of excess liquid, dried and calcined by heating in air. The finished Li/Sn/P/O catalyst contained about 12 weight percent phosphorus and about 2 weight percent lithium.

Catalyst C, which is not a catalyst of this invention, was prepared from Catalyst A but the impregnations with phosphorus and lithium, employing these materials in the quantities used above, were carried out simultaneously. Its final composition was the same as that of Catalyst B.

Catalyst D, which is not a catalyst of this invention, was prepared by impregnating Catalyst A with lithium by immersing a 25 ml quantity of Catalyst A in 35 ml of an aqueous solution containing 19.8 g of $LiNO_3$ for 5 minutes. The excess liquid was drained from the pellets and the pellets were dried and then calcined according to that method employed for Catalyst B. The resulting Li/Sn/P/O catalyst contained about 10 weight percent phosphorus and about 2 weight percent lithium.

Catalyst E, which is not the catalyst of this invention, was prepared by impregnating Catalyst A with lithium and, after drying and calcining, was impregnated with phosphorus, dried and calcined. It contained about 12 weight percent phosphorus and about 2 weight percent lithium.

The above catalysts were employed under substantially identical conditions in the oxidative-dehydrogenation of butene-2 to butadiene, these conditions including a butene- space velocity of 300 GHSV, a 4 to 1 air to butene-2 ratio, an 18 to 1 steam to butene-2 ratio, a temperature of about 1000°F., and atmospheric pressure. Results were as follows:

TABLE I

| Catalyst | Yield, % | Modivity, % | Catalyst Crushing Strength, No. Unused | After 6–8 Hours Use |
|---|---|---|---|---|
| A | — | — | 5.6 | — |
| B | 53.1 | 97.3 | 12.9 | 12.5 |
| C | 53.0 | 96.0 | 8.6 | 5.5 |
| D | 58.2 | 92.7 | ~8 | 4.4 |
| E | 43.6 | 85.1 | 11.7 | 9.1 |

In the above table, the term "modivity" refers to a simplified selectivity based on gas phase products only and also neglecting small amounts of oxygenated hydrocarbons in the gas phase.

The above data indicate that Catalyst B had the highest crushing strength both before and after dehydrogenation. These data also indicate that the order of the impregnation with respect to the lithium and phosphorus and the impregnation therewith sequentially is critical to the method of this invention.

As mentioned, in one embodiment of this invention a used catalyst having impared catalytic activity is impregnated with phosphorus and with lithium, consecutively, to restore the activity of the catalyst. This is exemplified by the following example:

EXAMPLE II

Catalyst F was a commercially prepared Li/Sn/P/O catalyst having impaired activity. It had been employed in the oxidative dehydrogenation of butenes to produce butadiene. It contained about 10 weight percent phosphorus and about 2 weight percent lithium.

Catalyst G was a catalyst rejuvenated according to the method of this invention. It was prepared by impregnating 25 g of Catalyst F with 2.0 g $H_3PO_4$ (85 percent) diluted to 11 ml. The impregnated tablets were dried and calcined in air at 1200°F. for 3 hours. In this manner, the phosphate content of Catalyst G was made to exceed that of Catalyst F by about 2 weight percent.

Catalyst M was a catalyst rejuvenated according to the method of the invention by successive impregnations with $H_3PO_4$ and lithium nitrate. About 25 g of Catalyst F were impregnated with 11 ml aqueous solution containing 2.0 g of $H_3PO_4$ (85 percent). The tablets were dried and calcined and then impregnated with an 11 ml aqueous solution containing 1.25 g of $LiNO_3$. The tablets were again dried and calcined. The rejuvenated catalyst was thusly impregnated with about 2 weight percent phosphorus and about 0.5 weight percent lithium.

Catalysts F, G and M were employed in the oxidative dehydrogenation of butene-2 to butadiene under the conditions of the previous runs. Results were as follows:

TABLE II

| Catalyst | Yield, % | Modivity, % | Catalyst Crushing Strength, No. Initial | After |
|---|---|---|---|---|
| F | 76 | 95 | 2.6 | 2.8 |
| G | 62 | 91 | 8.3 | 7.1 |
| M | 60 | 97 | 6.7 | 4.9 |

These data indicate that Catalysts G and M, regenerated in accordance with the method of this invention, have improved physical strength.

It will be evident from the foregoing that various modifications can be made to this invention. Such, however, are considered as being within the scope of the invention.

What is claimed is:

1. A method of oxidatively dehydrogenating an organic feed selected from the group consisting of alkenes, cycloalkenes, alkylpyridines, and alkylaromatics by contacting said feed with a free oxygen-containing gas and a catalyst prepared by:
   a. impregnating a calcined composition consisting essentially of tin, phosphorus and oxygen, said composition containing from about 0.1 to about 14 weight percent phosphorus, with a calcinable phosphorus-containing compound to increase the phosphorus content to a maximum of about 15 weight percent;
   b. calcining the composition produced in step (a);
   c. incorporating into the calcined composition of step (b) a calcinable compound of a metal selected from Group IA or IIA of the Periodic Table; and,
   d. calcining the composition formed in step (c) to produce said catalyst.

2. A method according to claim 1 wherein said oxidative dehydrogenation is carried out at a temperature within the range of 700° to 1300°F at a pressure from about 0.05 to about 250 psig and said oxygen-containing gas is air, and wherein a volumetric ratio of oxygen to gaseous organic feed is within the range of 0.1 to 1 to 3 to 1.

3. A method according to claim 2 wherein said feed is butene-2 and a product obtained thereby is butadiene.

4. A method according to claim 3 wherein said metal is lithium.

5. A method of oxidatively dehydrogenating an organic feed selected from the group consisting of alkenes, cycloalkenes, alkylpyridines, and alkylaromatics by contacting said feed with a free oxygen-containing gas and a catalyst consisting essentially of a composition prepared by reactivating a calcined catalyst of a metal selected from Group IA or Group IIA of the Periodic Table, tin, phosphorus and oxygen, said catalyst having been at least partially deactivated in oxidative dehydrogenation of said organic feed which comprises:

a. impregnating said catalyst with a calcinable, phosphorus-containing compound to increase the phosphorus content of said catalyst of a maximum of about 15 weight percent; and, b. calcining the composition produced in step (a).

6. The method of claim 5 in which the calcined composition of step (b) is impregnated with lithium and the thus lithium-impregnated composition is calcined.

7. The method of claim 6 in which the phosphorus is impregnated into said composition in step (a) of impregnation of said composition from a phosphorus-containing solution.

8. The method of claim 7 in which said partially deactivated catalyst consists essentially of tin, phosphorus, oxygen and lithium prepared by coprecipitation of a phosphorus-containing compound and a tin-containing compound, calcining a said resulting composition, impregnating phosphorus into said thus calcined composition from a phosphorus-containing solution calcining said composition thus impregnated with phosphorus, impregnating said thus calcined phosphorus-containing composition with lithium and calcining said composition thus impregnated with lithium.

* * * * *